United States Patent
Hoshino et al.

(10) Patent No.: US 7,876,536 B2
(45) Date of Patent: Jan. 25, 2011

(54) MULTILAYERED FILM HAVING CRYSTAL GRAINS GROWN AT AN INCLINATION TO A SUBSTRATE, AND MAGNETORESISTIVE HEAD USING THE FILM

(75) Inventors: Katsumi Hoshino, Kanagawa (JP); Hiroyuki Hoshiya, Kanagawa (JP); Kenichi Meguro, Kanagawa (JP); Yo Sato, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 780 days.

(21) Appl. No.: 11/784,212

(22) Filed: Apr. 4, 2007

(65) Prior Publication Data
US 2007/0274009 A1 Nov. 29, 2007

(30) Foreign Application Priority Data
Apr. 4, 2006 (JP) .............................. 2006-103416

(51) Int. Cl.
*G11B 5/39* (2006.01)
(52) U.S. Cl. .............................................. 360/324.11
(58) Field of Classification Search ............ 360/324.11
See application file for complete search history.

(56) References Cited

U.S. PATENT DOCUMENTS

| | | | |
|---|---|---|---|
| 6,504,688 B2 | 1/2003 | Hasegawa et al. | |
| 6,853,521 B2 * | 2/2005 | Hasegawa et al. | 360/324.11 |
| 6,862,158 B2 * | 3/2005 | Hasegawa et al. | 360/324.11 |
| 7,106,559 B2 * | 9/2006 | Hasegawa et al. | 360/324.11 |
| 7,119,996 B2 | 10/2006 | Hasegawa et al. | |
| 7,443,636 B2 * | 10/2008 | Hoshino et al. | 360/324.1 |

FOREIGN PATENT DOCUMENTS

| | | |
|---|---|---|
| JP | 2002-025822 | 1/2002 |
| JP | 2002-094141 | 3/2002 |
| JP | 2002-171010 | 6/2002 |

OTHER PUBLICATIONS

Katine et al., "Patterning damage in narrow trackwidth spin-valve sensors," *Applied Physics Letters*, vol. 83, Issue 2, id. 401 (2003).

* cited by examiner

*Primary Examiner*—A. J. Heinz
(74) *Attorney, Agent, or Firm*—GMG Intellectual Property Law; Guadalupe M. Garcia (57) ABSTRACT

Embodiments of the present invention provides sufficiently high exchange coupling with a magnetic layer and improve the yield and reliability of a magnetoresistive head. By using a tilted growth crystalline structured antiferromagnetic film manufactured by an oblique incident deposition method, a high exchange coupling field with a ferromagnetic film can be obtained. As a result, excellent reliability and high output can be obtained in a magnetoresistive head utilizing features in accordance with embodiments of the present invention.

14 Claims, 8 Drawing Sheets

MULTILAYERED FILM HAVING CRYSTAL GRAINS GROWN AT AN INCLINATION TO A SUBSTRATE, AND MAGNETORESISTIVE HEAD USING THE FILM

CROSS-REFERENCE TO RELATED APPLICATION

The instant nonprovisional patent application claims priority to Japanese Application No. 2006-103416, filed Apr. 4, 2006 and incorporated by reference in its entirety herein for all purposes.

BACKGROUND OF THE INVENTION

In the current magnetic storage apparatus, a write/read composite magnetoresistive head is used in which writing is performed by using an inductive recording head and reading is performed by using a magnetoresistive head. A magnetoresistive film where the electrical resistance changes depending on the external magnetic field is adopted in a magnetoresistive head, and a spin-valve is employed in which a so-called giant magnetoresistive effect is used, i.e. a magnetoresistive effect created by stacking a ferromagnetic film and a non-magnetic film. The spin-valve has a structure consisting of antiferromagnetic film/ferromagnetic film (pinned layer)/non-magnetic intermediate film/ferromagnetic film (free layer). Since current usually flows in the plane of the spin-valve in the magnetoresistive head, it is called a CIP-GMR.

Moreover, in recent years, in order to increase the sensitivity of the magnetoresistive film, a CPP-GMR where current flows perpendicular to the film surface of the spin-valve and a tunneling magnetoresistive film (TMR) having a structure of antiferromagnetic film/ferromagnetic film (pinned layer)/barrier/ferromagnetic film (free layer), in which current flows perpendicular to the film surface, have undergone research.

As mentioned above, in either CIP-GMR, CPP-GMR, or TMR, an antiferromagnetic film and a ferromagnetic film are stacked and exchange coupling between them is utilized. Therefore, the characteristics of the antiferromagnetic film are very important and various methods have been disclosed for improvement of the characteristics as shown in Japanese Patent Application No. 171010/2002 ("patent document 1"), Japanese Patent Application No. 25822/2002 ("patent document 2"), and Japanese Patent Application No. 94141/2002 ("patent document 3").

Patent documents 1-3 disclose a MnPt film where ordered structure is necessary, and, in the case of the MnPt film where ordering is necessary, it is described that the lattice distortion during transformation of the crystal structure has to be relieved in order to improve the exchange coupling. As a method thereto, patent documents 1 and 2 pay attention to the twin boundary formed during transformation of the crystal structure, in which crystal growth is symmetric through the grain boundary. These documents describe that the exchange coupling becomes greater by controlling the bicrystal grain boundary so that they are not parallel to the interface between the MnPt and the ferromagnetic layer. Moreover, patent document 3 discloses a method in which the lattice mismatch between the MnPt and the ferromagnetic layer are caused by displacement of the crystal plane and in which the lattice distortion during transformation of the crystal structure is not allowed to generate.

The control of these twin boundaries and the crystal plane of MnPt can only be controlled by film preparation conditions. The direction and angle of the twin boundary and the crystalline orientation are formed by the transformation of the crystal structure during heat treatment, making it difficult to control these preparation conditions.

As mentioned above, in either CIP-GMR, CPP-GMR, or TMR magnetoresistive head, an antiferromagnetic film and a ferromagnetic film are stacked and the exchange coupling between them is utilized. When increasing the areal recording density of the magnetic storage apparatus, the head is downsized, thereby, the characteristics of the antiferromagnetic layer are deteriorated and a decrease in the exchange coupling and dispersion thereof are created by the damage during processing (for instance, Applied Physics Letters, Vol. 83, p. 401 (2003)) or by decreasing the volume of the antiferromagnetic film. This may lead to a decrease in the yield of the head and to deterioration in reliability.

BRIEF SUMMARY OF THE INVENTION

Embodiments in accordance with the present invention provides sufficiently high exchange coupling with a magnetic layer and improves the yield and reliability of a magnetoresistive head. In accordance with the particular embodiment illustrated in FIG. 2(a), by using a tilted growth crystalline structured antiferromagnetic film 23 manufactured by an oblique incident deposition method, a high exchange coupling field with a ferromagnetic film 24 can be obtained. As a result, excellent reliability and high output can be obtained in a magnetoresistive head utilizing features in accordance with embodiments of the present invention.

DETAILED DESCRIPTION OF THE INVENTION

Embodiments in accordance with the present invention relate to an antiferromagnetic film having excellent characteristics, a producing method thereof, and a magnetoresistive head corresponding to a high magnetic recording density.

An objective of embodiments of the present invention is to enhance the exchange coupling between the antiferromagnetic film and the ferromagnetic film sufficiently in order to suppress the decrease in the yield of the head and the deterioration in reliability caused by the damage from the processing and downsizing of the volume of the antiferromagnetic film.

In accordance with one embodiment of the present invention, in a multilayer body composed of an antiferromagnetic film and a ferromagnetic film, an antiferromagnetic film is formed by a sputtering method with oblique incidence from one diagonal direction. According to this process, the crystal grains of the antiferromagnetic grow with an inclination against a direction of the normal to the substrate and the grain boundaries are aligned in almost the same direction in the said antiferromagnetic film, resulting in an improvement in the exchange coupling between the antiferromagnetic film and the ferromagnetic film. Moreover, even if a film formed underneath the antiferromagnetic film is formed by the sputtering method with oblique incidence from one diagonal direction, it is beneficial to improve the exchange coupling between the antiferromagnetic film and the ferromagnetic film.

Furthermore, by applying these multilayered films to a magnetoresistive head, deterioration of the exchange coupling between the antiferromagnetic film and the ferromagnetic film caused by the process damage and downsizing is suppressed, the yield is improved, and the reliability is improved.

As mentioned above, in a multilayered film consisting of an antiferromagnetic film and a ferromagnetic film, the exchange coupling between the antiferromagnetic film and the ferromagnetic film is improved by applying a tilted growth crystalline structure to the antiferromagnetic film or to a film underneath the antiferromagnetic film. By applying these multilayered films to a magnetoresistive head such as a CIP-GMR, a TMR, and a CPP-GMR, a decrease in the yield and deterioration of reliability caused by the exchange coupling between the antiferromagnetic film and the ferromagnetic film can be suppressed even if the size of the head is decreased or process damage occurs. Moreover, an excellent magnetic head can be obtained by combining these magnetoresistive heads with an inductive recording head or a perpendicular recording head. Furthermore, a magnetic storage apparatus using this magnetic head has excellent characteristics.

Embodiments in accordance with the present invention are enumerated below, and described more concretely with reference to the diagrams as follows.

Embodiment 1

Figure 1A:
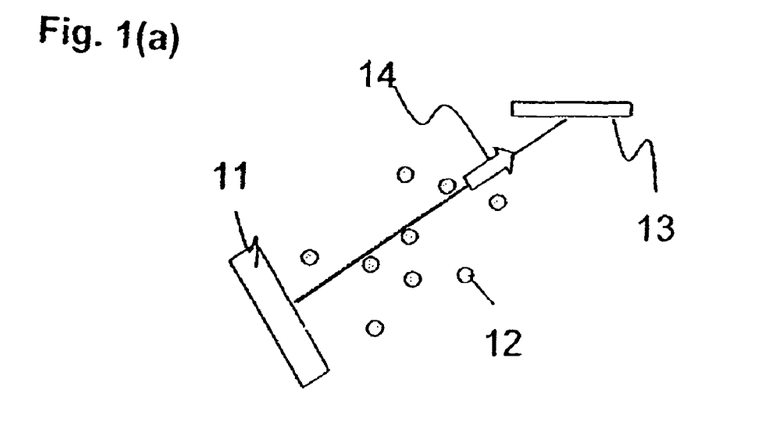
FIGS. 1(a)-1(c) are graphs for explaining a film deposition method.
Figure 1B:
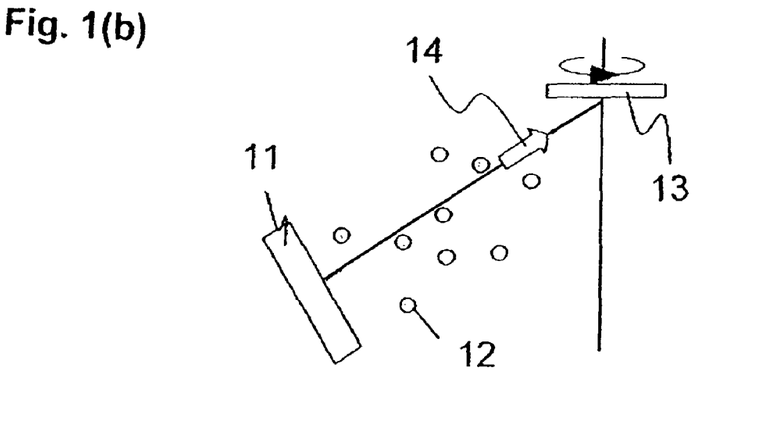
Figure 1C:
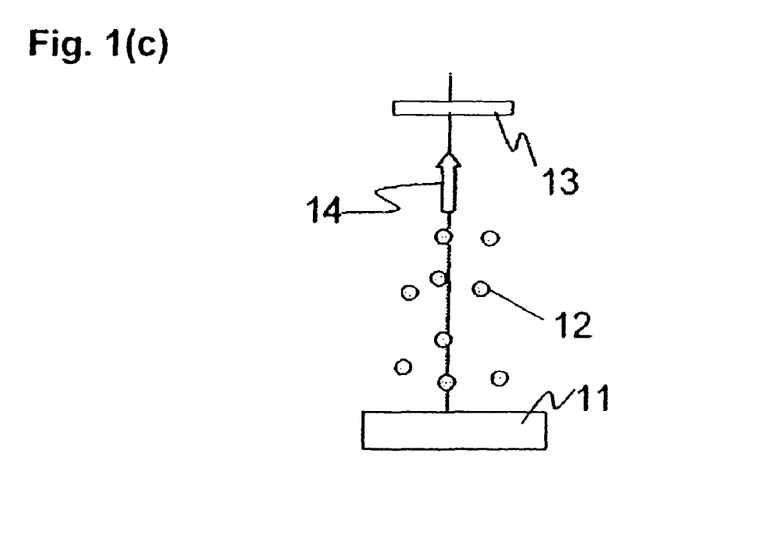

First, a formation method of a tilted growth crystalline structure will be explained. Conventionally, in deposition by using a sputtering method, a film is formed by placing a target 11 opposite a substrate 13 as shown in FIG. 1(c) or, as shown in FIG. 1(b), by setting the arrangement of the substrate and the target 11 in a direction diagonal to each other and rotating the substrate 13, thereby, the direction of flight 14 of the sputtered particles 12 against the substrate is made uniform, resulting in the film thickness being made constant. By using these methods, the crystal structure is formed uniformly in the entire film. On the other hand, in a method of the present invention as shown in FIG. 1(a), although the arrangement of the substrate 13 and the target 11 is the same as those of FIG. 1(b), deposition is performed by not using rotation of the substrate. Therefore, the direction of flight 14 of the sputtered particles 12 is always the same against the substrate. As a result, a tilted crystal grain structure can be formed. However, in this method, the film thickness at the side where the distance between the target and the substrate is small becomes thicker and the film thickness at the side far away from the target becomes readily thinner. Considering the case of the production of a magnetic head, since the film thickness has to be maintained uniformly in the plane, it is preferable that the revolution is given to the substrate.

Next, a multilayered film was prepared by actually using these methods. An RF magnetron sputtering method was used for the preparation of the multilayered film. Herein, the target cathode was arranged inclined about 45° against a direction of the normal to the substrate and the formation of the inclined crystal grain structure of an embodiment of the present invention was carried out by not rotating the substrate as shown in FIG. 1(a) and by incidence of the sputtered particles from a same direction using a detection of substrate position. Moreover, as a comparison, a multilayered film was prepared by using a conventional method where the substrate was always rotated while depositing the film as shown in FIG. 1(b). A magnetic field of about 80 Oe was applied by using a permanent magnet while depositing the film. After deposition of the multilayered film, heat treatment was performed at 270° C. for three hours in vacuum. At this time, the applied magnetic field was 14 kOe.

Figure 2A:
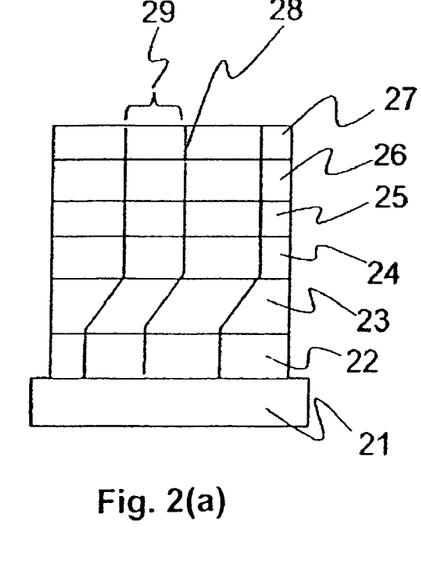
FIGS. 2(a)-2(b) are schematic cross-sectional views illustrating an example of an antiferromagnetic/ferromagnetic multilayer.
Figure 2B:
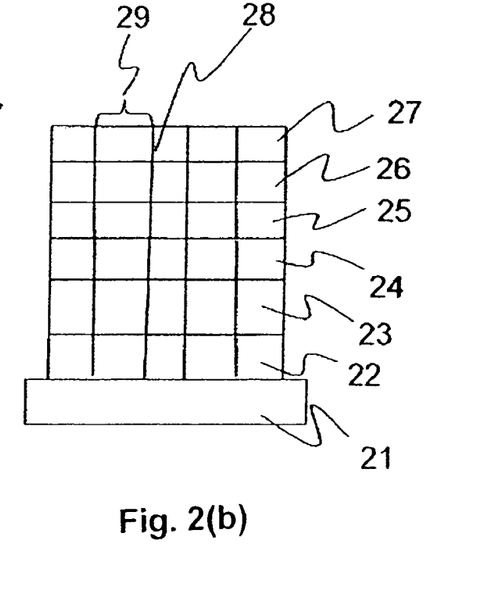

FIGS. 2(a)-(b) are schematic cross-sectional drawings illustrating an example of a multilayered film composed of an antiferromagnetic film and a ferromagnetic film. FIG. 2(a) is a schematic cross-sectional drawing illustrating a multilayered film according to one embodiment of the present invention and FIG. 2(b) is a schematic cross-sectional drawing illustrating a multilayered film of a comparative example. Herein, a multilayered film consisting of an antiferromagnetic film and a ferromagnetic film was formed in the spin-valve structure, and the characteristics were evaluated.

The multilayered film according to embodiments of the present invention shown in FIG. 2(a) was first formed by depositing a 6 nm thick NiFeCr seed layer on a Si substrate 21 while rotating the substrate. Next, rotation was stopped and the sputtered particles were made to come flying from one diagonal direction and Mn-20 at. % Ir was formed to be 10 nm thick as an antiferromagnetic film 23. By using a sputtering method while rotating the substrate, 3 nm thick Co-90 at % Fe was formed thereon as a ferromagnetic film (pinned layer) 24, 2.5 nm thick Cu as an intermediate layer 25, 3 nm thick Co-10 at % Fe as a ferromagnetic film (free layer) 26, and 2 nm thick Cu as a cap layer 27. As shown in FIG. 2(a), since sputtering with oblique incidence toward one direction is carried out when the antiferromagnetic film 23 is formed, the crystal grain boundaries 28 in the antiferromagnetic layer are inclined to the direction of flight of the sputtered particles and a tilted growth crystalline structure is created where the crystal grains 29 grow diagonally.

On the other hand, in a conventional multilayered film in which the substrate is rotated when the antiferromagnetic film 23 is deposited, as shown in FIG. 2(b), the sputtered particles come from all directions to film surface, so that the crystal grains 29 grow almost parallel along the normal line of the substrate 21.

Figure 3A:
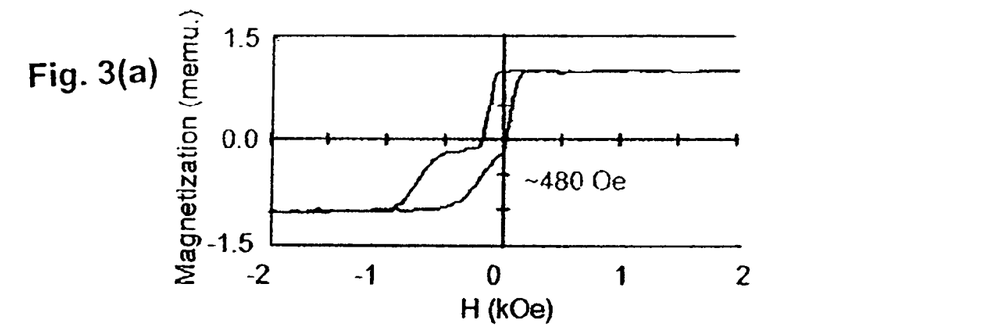
FIGS. 3(a)-3(b) are graphs of BH loops of the spin-valve films.
Figure 3B:
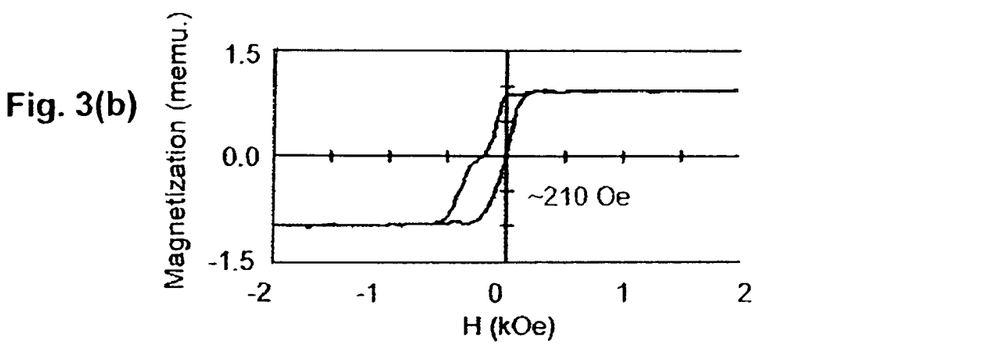

FIG. 3 shows BH loops of these spin-valves. FIG. 3(a) shows a BH loop of the multilayered film according to embodiments of the present invention where the cross-sectional structure is shown in FIG. 2(a) and FIG. 3(b) shows a BH loop of the multilayered film of the prior art where the cross-sectional structure is shown in FIG. 2(b). As shown in the figure, the BH loop consists of a combination of two loops caused by the free layer and the pinned layer, in which the part reversing at around zero magnetic field is a magnetization curve caused by the free layer and the part shifted from the zero magnetic field is a BH loop caused by the pinned layer. The amount of shift of the magnetic pinned layers in FIG. 3(a) and FIG. 3(b) is 480 Oe and 210 Oe, respectively, and it is understood that the exchange coupling between the antiferromagnetic film and the ferromagnetic film (pinned layer) according to embodiments of the present invention is very large compared with the prior art.

According to the cross-sectional TEM observation of the antiferromagnetic film formed inclined, it reveals that the crystal grains are inclined about 20° against a direction of the normal to the substrate. Although the inclination becomes smaller compared with the 45° which is the incident angle between the substrate and the target, it is understood that a larger exchange coupling could be obtained by inclining the crystal grains 20°.

Figure 4A:
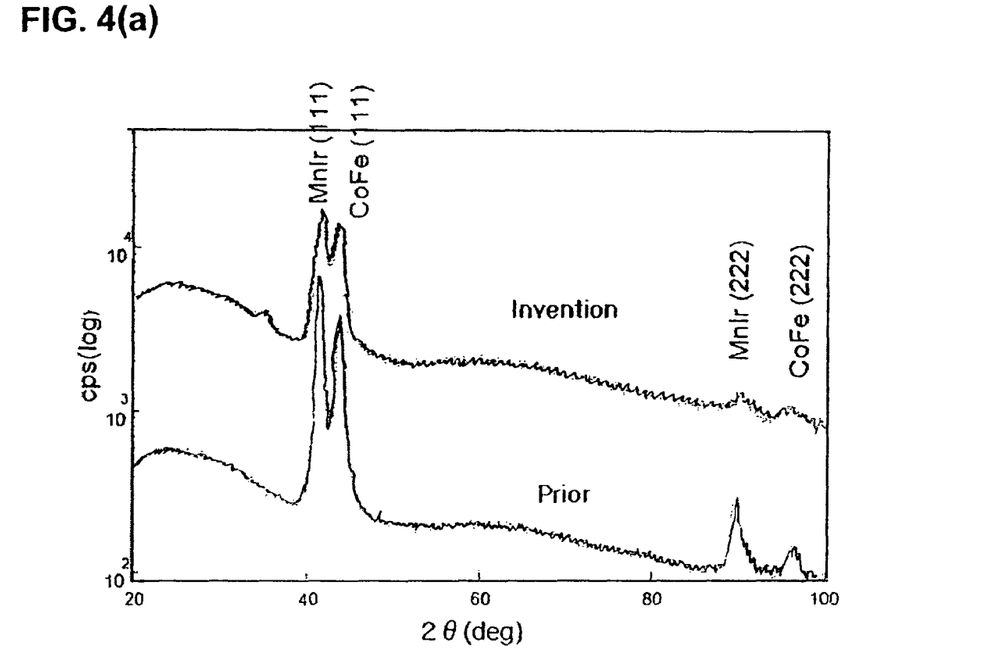
FIGS. 4(a)-4(b) are graphs of X-ray diffraction profiles for spin-valve films.
Figure 4B:
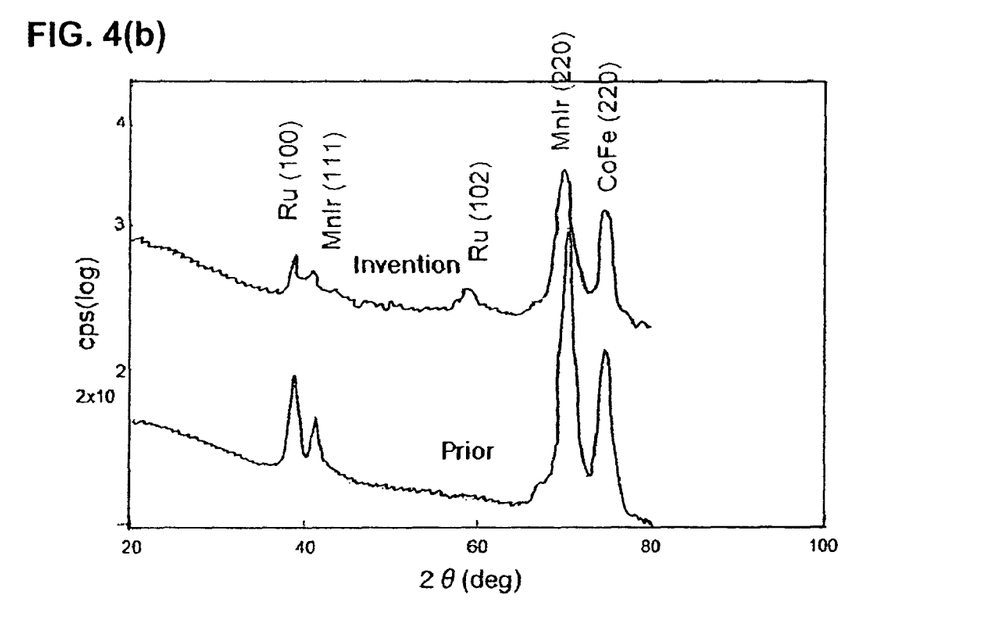

In order to find out the reason for the increase in the exchange coupling field, the crystal structures of the multilayered film according to embodiments of the present invention and the multilayered film of the prior art are evaluated by X-ray diffraction analyses. FIG. 4 shows these results. FIG. 4(a) is the result of wide angle X-ray diffraction analyses. Although the MnIr (111) peak of an fcc structure is observed, the peak position thereof in the multilayered film of the present invention is shifted to the wide angle side compared with the conventional multilayered film. On the other hand, according to the results of in-plane X-ray as shown in FIG. 4(b), the peak of MnIr (111) is observed, however, the peak position thereof in the multilayered film of the present invention is shifted to the low angle side compared with the conventional multilayered film. As a result, when the lattice spacing constant is obtained from these diffraction peaks of MnIr (111), the lattice spacing constant of the MnIr of the conventional structure is 0.3783 nm in both the in-plane direction and the film thickness direction. On the other hand, the lattice spacing constant of the multilayered film having a structure of the present invention is 0.3769 nm in the film thickness direction and 0.3807 nm in the in-plane direction, so that the crystal lattice is compressed in the film thickness direction and tensioned about 1% in the in-plane direction of the film. Distortion is introduced into the crystal lattice of the antiferromagnetic layer by growing the crystal grains of the antiferromagnetic layer diagonally, so that there is a possibility that it changes the magnetic anisotropic energy of the antiferromagnetic film and a high exchange coupling field can be obtained.

In the multilayered film according to embodiments of the present invention, bicrystals described in patent documents 1-3 can not be observed in the results of cross-sectional TEM. Since the crystal grain boundaries are also inclined but they are not randomly oriented as described in the patent documents, it is understood that the effects of the present invention are different from those of patent documents 1-3. In the multilayered film of embodiments of the present invention, since the crystal grain boundaries are aligned in the incident direction of the sputtered particles and distortion is induced in the crystal lattice of the antiferromagnetic film, it is thought that high exchange coupling is obtained because of the effects where the crystal grain boundaries are aligned in the same direction in the film and/or the crystal lattice of the antiferromagnetic film is distorted.

In this embodiment, although the ferromagnetic film 24 is deposited after forming the antiferromagnetic film 23, the same effects may be obtained if the reverse multilayer structure is manufactured. However, the upper side is more strongly influenced by the tilted growth crystalline structure compared with the lower side of the antiferromagnetic film, so that greater effects can be obtained when the ferromagnetic film is formed on the antiferromagnetic film.

Embodiment 2

Figure 5:
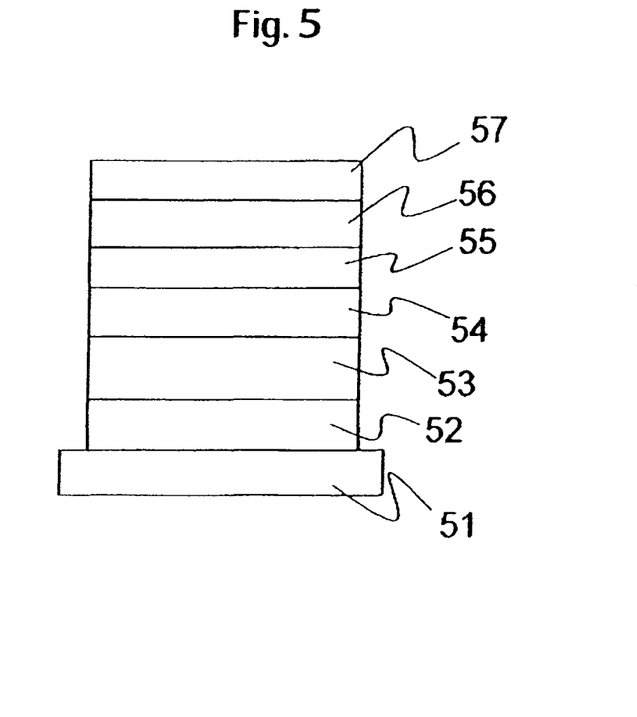
FIG. 5 is a schematic cross-sectional view of a multilayered film composed of antiferromagnet and ferromagnet films.

Another multilayered film is formed by using the oblique deposition method as embodiment 1. In this embodiment, a film was formed by using a DC magnetron sputtering method. FIG. 5 is a schematic cross-sectional drawing illustrating a multilayered film including an antiferromagnetic film and a ferromagnetic film formed in this embodiment. In this embodiment, a multilayered film consisting of an antiferromagnetic film and a ferromagnetic film was formed in the spin-valve structure, and the characteristics were evaluated.

Figure 6A:
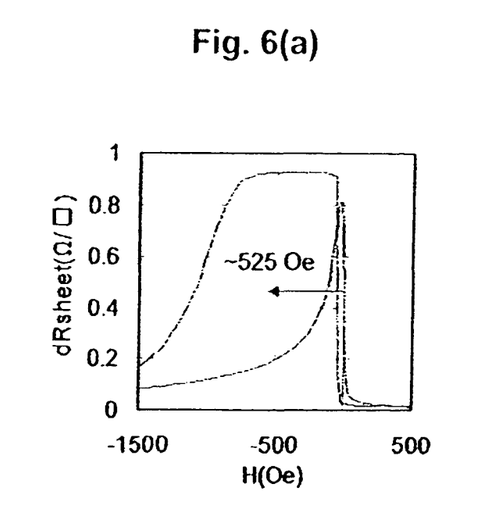
FIGS. 6(a)-6(b) are graphs of the magnetoresistance curves for the spin-valve films.
Figure 6B:
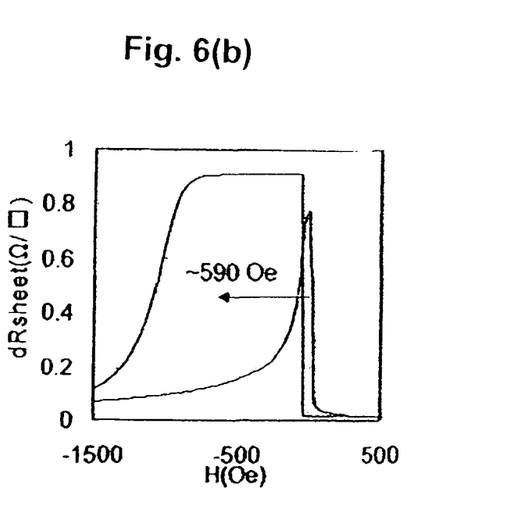

As shown in FIG. 5, a stacked seed layer 52 consisting of 4 nm thick NiFeCr and 1 nm thick NiFe were formed on a Si substrate 51 by using a sputtering method while rotating the substrate. Next, rotation of the substrate was stopped and, as an antiferromagnetic film 53, Mn-50 at. % Pt was formed to be 15 nm thick from the diagonal direction. Herein, the incident angle of the sputtered particles is inclined about 30° against a direction of the normal to the substrate. By using a sputtering method with a rotating substrate, 3 nm thick Co-10 at % Fe is formed thereon as a ferromagnetic film (pinned layer) 54, 2.5 nm thick Cu as an intermediate layer 55, 3 nm thick Co-10 at % Fe as a ferromagnetic film (free layer) 56, and 2 nm thick Cu as a cap layer 57, in order. As a comparative example, a multilayered film was prepared by rotating the substrate while forming the antiferromagnetic film 53. A magnetic field of about 80 Oe was applied by using a permanent magnet while depositing the film. After deposition of the multilayered film, heat treatment was performed at 270° C. for three hours in vacuum. At this time, the applied magnetic field was 14 kOe. The coupling fields of these films were evaluated by the magnetoresistance curves shown in FIG. 6 and it is understood that the exchange coupling field of this embodiment of the present invention was improved to 590 Oe compared with 525 Oe of the comparative example.

According to the cross-sectional TEM observation of the antiferromagnetic film according to embodiments of the present invention formed inclined, it is understood that the crystal grains are inclined about 10° against a direction of the normal to the substrate. Although the inclination angle becomes smaller compared with the injection angle of the sputtered particles, 30°, it is thought that a comparatively larger exchange coupling can be obtained by inclining the crystal grains 10°.

Although MnIr and MnPt were used as antiferromagnetic films in the embodiments 1 and 2, the same effects could be obtained even if an antiferromagnetic film such as MnPd, MnRu, MnRh, and MnCrPt were used.

Embodiment 3

Still another multilayered film was formed by using the same method as embodiment 2. Characteristics of the multilayered film were evaluated by the spin-valve structure in this embodiment.

The film structure will be explained by using FIG. 5. A 6 nm thick NiFeCr film was formed as a seed layer 52 on the Si substrate 51 by using a sputtering method without substrate rotation. After that, films were formed, in order, while rotating the substrate. By using a sputtering method, 7 nm thick MnIr was formed as an antiferromagnetic film 53, 3 nm thick Co-25 at % Fe as a ferromagnetic film (pinned layer) 54, 1.5 nm thick Cu as an intermediate film 55, 3 nm thick Co-10 at % Fe as a ferromagnetic film (free layer) 56, and 2 nm thick Cu as the cap layer 57. As a comparison, a multilayered film was prepared where all the films including the seed layer were formed by using a sputtering method with substrate rotation. A magnetic field of about 80 Oe was applied by using a permanent magnet while depositing a film. After deposition of the film, heat treatment was performed at 270° C. for three hours in vacuum. At this time, the applied magnetic field was 14 kOe.

According to the evaluation of the exchange coupling, the exchange coupling field of the multilayered film in the comparative example was 1062 Oe. On the other hand, the exchange coupling field of the multilayered film where the seed layer of one embodiment of the present invention was formed by using oblique deposition method was 1354 Oe, which was an improvement over the multilayered film of the comparative example. As in this embodiment, even if the film formed underneath the antiferromagnetic film is formed by using inclined injection, it is understood that the exchange coupling field between the antiferromagnetic film and the ferromagnetic film can be improved.

According to the evaluation of these multilayered films by using the same X-ray diffraction analyses as the embodiment 1, the lattice spacing constant of the antiferromagnetic film in the multilayered film of the present invention obtained from the diffraction peak of MnIr (111) was 0.3776 nm in the film thickness direction and 0.3792 nm in the in-plane direction, so that it is understood that the crystal of the antiferromagnetic film is distorted about 0.4% in the in-plane direction, the same as the embodiment 1. From the observation of the cross-sectional TEM of the antiferromagnetic film formed with inclination, it is found that the crystal grains are inclined about 10° against the direction of the normal to the substrate. Therefore, there is a possibility that the lattice spacing of the antiferromagnetic film is similarly distorted and that the magnetic anisotropy is changed by inclining the film formed underneath the antiferromagnetic film.

A method where a seed layer is formed by inclination was described in this embodiment. On the other hand, in a structure where the film configuration of FIG. 5 is reversed, a so-called top-type spin-valve, an antiferromagnetic film is formed on a ferromagnetic film. With respect to the top-type spin-valve, the exchange coupling between the antiferromagnetic and ferromagnetic films can be similarly improved by forming the ferromagnetic film formed underneath this antiferromagnetic film by using an oblique deposition method.

Embodiment 4

Figure 7:
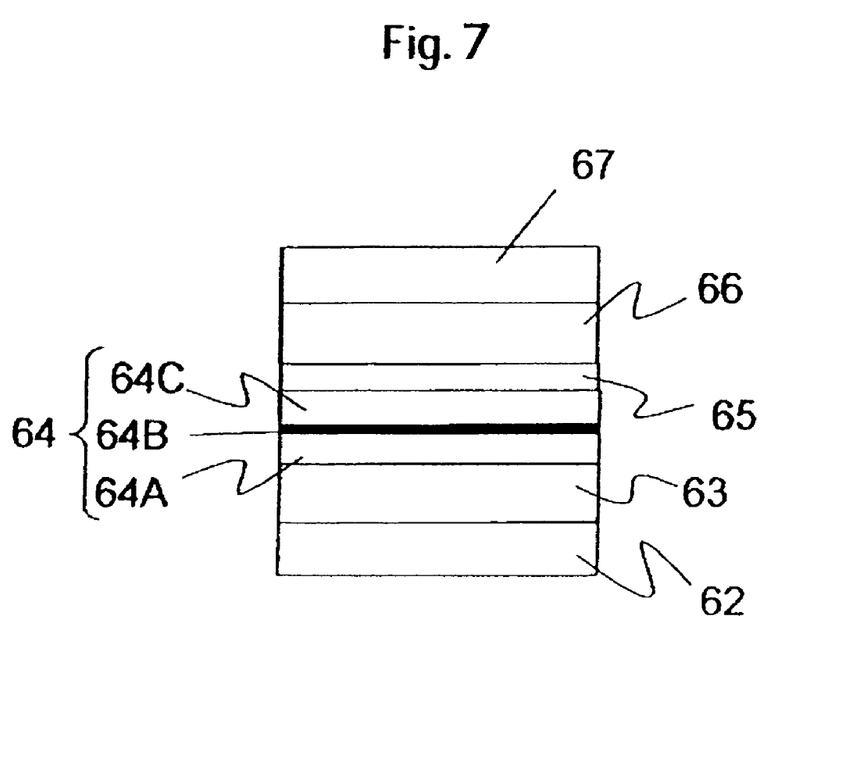
FIG. 7 is a cross-sectional view of a magnetoresistive film.

A magnetoresistive head was prepared by using an antiferromagnetic film having a tilted growth crystalline structure according to embodiments of the present invention. FIG. 7 is a schematic drawing illustrating a film configuration of a magnetoresistive film. After forming NiFeCr (5 nm) as a seed layer 62, an antiferromagnetic film 63 was formed. When the antiferromagnetic film was formed, the rotation of the substrate was stopped and the sputtered particles are made so as to come from an inclined direction which is a direction inclined about 45° from the normal line direction. Using this method, a Mn-50 at. % Pt antiferromagnetic film (6 nm) was formed. After that, deposition was performed again while rotating the substrate. A so-called synthetic ferrimagnet structure was applied to a pinned layer 64 where two ferromagnetic films 64A and 64C were stacked through an antiferromagnetic-coupling film 64B, and it was formed as CoFe (1.5 nm)/Ru (0.8 nm)/CoFe (2 nm). Next, by using a sputtering method, Cu (2.1 nm) was formed as an intermediate layer 65, a CoFe (1 nm)/NiFe (2 nm) multilayered film as a free layer 66, and Cu (1 nm)/Ta (2 nm) as a cap layer 67. After deposition of the multilayered film, heat treatment was performed at 270° C. for three hours in vacuum. At this time, the applied magnetic field was 14 kOe.

Figure 8:
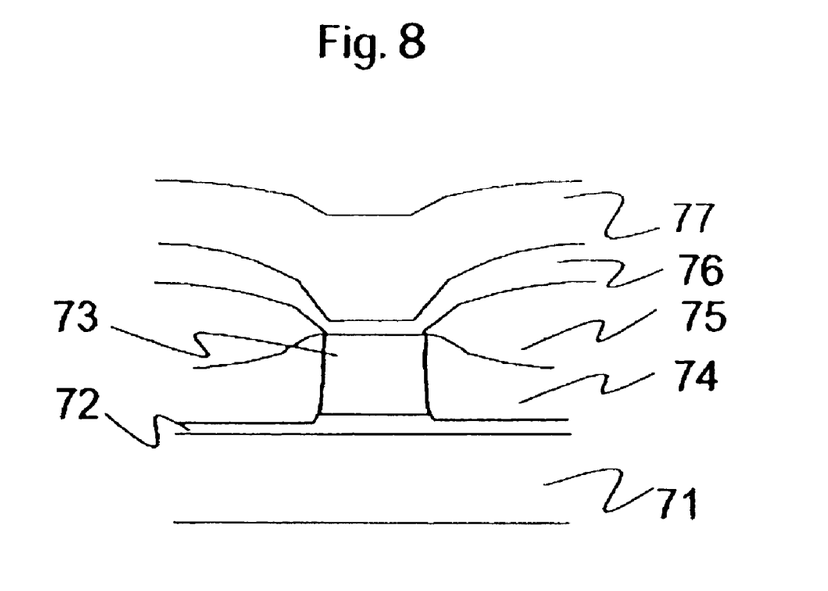
FIG. 8 is a schematic view illustrating a magnetoresistive (CIP-GMR) head as seen from the air bearing surface.

FIG. 8 is a schematic drawing illustrating a magnetoresistive (CIP-GMR) head using a tilted growth crystalline structured antiferromagnetic film of this embodiment as seen from the air bearing surface. This magnetoresistive head has a lower shield 71, a lower gap 72, a magnetoresistive film 73, domain control films 74, a pair of electrodes 75, an upper gap 76, and an upper shield 77. In this magnetoresistive head, there were few low output heads caused by degrading the magnetic exchange coupling between the antiferromagnetic film and ferromagnetic film (pinned layer), so that the yield and reliability were improved compared with the conventional structure. The yield of the conventional structure was 92% and the yield of the magnetoresistive head is improved to 96% by using this embodiment of the present invention.

In this embodiment, the film configuration shown in FIG. 6 was used. However, in order to improve the output using the specular effect, a structure may be used in which a nano-oxide-layer of Fe, Co, Al, Ta, Hf, Zr, Ti, Zn, and Mg, etc. is inserted in the pinned layer, the free layer, and the cap layer in the film.

Embodiment 5

Another magnetoresistive head was prepared by using an antiferromagnetic film having a tilted growth crystalline structure according to an embodiment of the present invention. In this embodiment, a tunneling magnetoresistive film was prepared.

Figure 9:
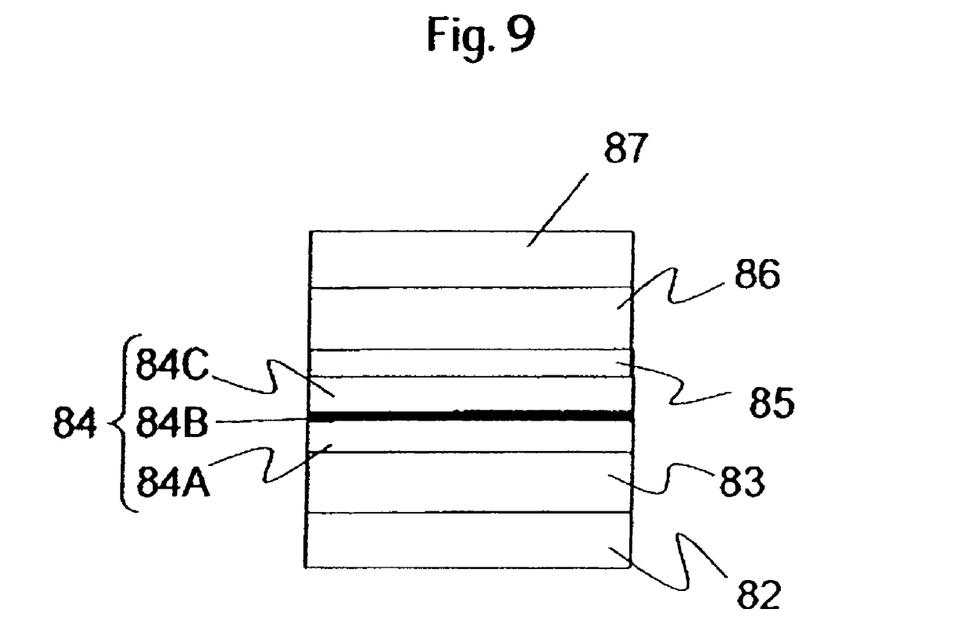
FIG. 9 is an example of a cross-sectional view of a tunneling magnetoresistive (TMR) film.

FIG. 9 is a schematic drawing illustrating a film configuration of a tunneling magnetoresistive film prepared in this embodiment. All films were formed by using a sputtering method. After forming Ta (2 nm)/NiFeCr (5 nm) as a seed layer 82, an antiferromagnetic film 83 was formed. At this time, the rotation of the substrate was stopped and the sputtered particles are made so as to come from an inclined direction which is a direction inclined about 45° from the normal line direction. Using this method, a Mn-20 at. % Ir antiferromagnetic film (6 nm) was formed. After that, deposition was performed again while rotating the substrate. A so-called synthetic ferrimagnet structure was applied to a pinned layer 84 where two ferromagnetic films 84A and 84C were stacked through an antiferro-coupling film 84B and it was formed as CoFe (2 nm)/Ru (0.8 nm)/CoFeB (2.5 nm). Next, after formation of a tunneling barrier layer 85 which was naturally oxidized Al (0.6 nm), a CoFeB (1 nm)/NiFe (2 nm) multilayered film and Ta (5 nm)/Ru (5 nm) were formed as a free layer 86 and a cap layer 87, respectively. After deposition of the multilayered film, heat treatment was performed at 270° C. for three hours in vacuum. At this time, the applied magnetic field was 14 kOe.

Figure 10:
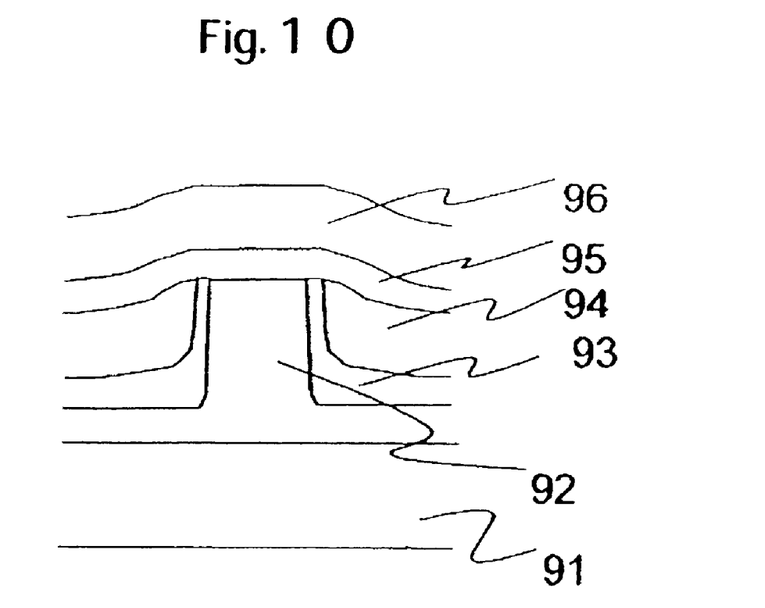
FIG. 10 is a schematic view illustrating a tunneling magnetoresistive (TMR) head as seen from the air bearing surface.

FIG. 10 is a schematic drawing illustrating a tunneling magnetoresistive (TMR) head using a tilted growth crystalline structured antiferromagnetic film of this embodiment as seen from the air bearing surface. This TMR head has a lower shield 91 working also as an electrode, a tunneling magnetoresistive (TMR) film 92, a gap film 93 for preventing electric contact between the upper electrode and the lower electrode, a domain control film 94, a conductive upper gap film 95, and an upper shield 96 working also as an electrode. In this magnetoresistive head, the yield and reliability were also improved compared with the tunneling magnetoresistive (TRM) head using the conventional antiferromagnetic film. The yield of the conventional structure was 78% and the yield was improved to 91% by using this embodiment of the present invention.

In this embodiment, an oxide layer of Al is used as a tunneling barrier film and an oxide film such as Mg, Hf, Zr, and Ta may be applied thereto.

Embodiment 6

Still another magnetoresistive head was prepared by using an antiferromagnetic film having a tilted growth crystalline structure according to embodiments of the present invention. In this embodiment, a screen type CPP-GMR was used where a confined current path layer was inserted.

Figure 11:
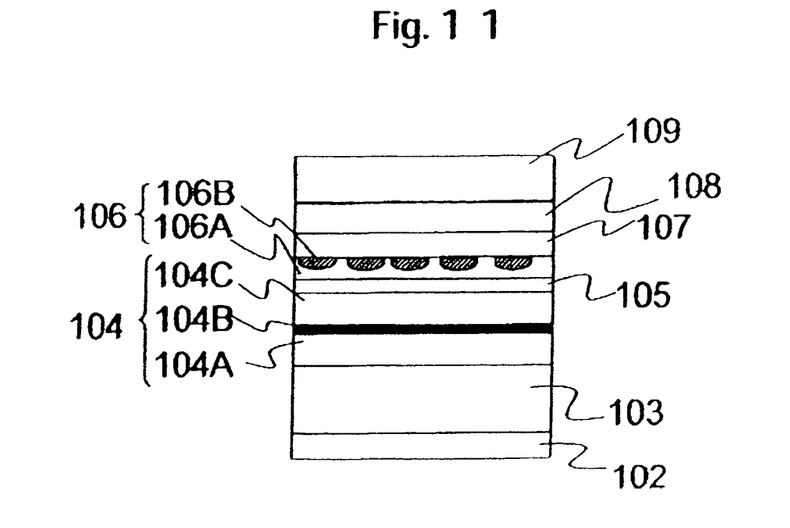
FIG. 11 is an example of a cross-sectional view of a screen type CPP-GMR film.

FIG. 11 is a schematic drawing illustrating a film configuration of a screen type CPP-GMR. All films were formed by using a sputtering method. After forming a Ta (2.5 nm)/NiFeCr (5 nm) double layered film as a seed layer 102, an antiferromagnetic film 103 was formed. When this antiferromagnetic film 103 was deposited, the rotation of the substrate was stopped and the sputtered particles were made so as to come from an inclined direction which is a direction inclined about 45° from the normal line direction. A Mn-20 at. % Ir antiferromagnetic film (6 nm) was formed by using this method. After that, deposition was performed again while rotating the substrate. A so-called synthetic ferrimagnet structure was applied to a pinned layer 104 where two ferromagnetic films 104A and 84C were stacked through an antiferro-coupling film 104B, and it was formed as CoFe (5 nm)/Ru (0.8 nm)/CoFe (5 nm). Next, a 0.5 nm thick Cu film 105 functioning as a protection layer from oxidization for the pinned layer while forming the confined current path layer and 1.5 nm thick CoFe for the confined current path layer 106 were formed, and natural oxidation was performed for 1 minute under a pressure of 700 Pa. After that, Cu (2 nm), a CoFe (1 nm)/NiFe (2 nm) double-layered film, and Cu (5 nm)/Ru (10 nm) were formed, in order, as an intermediate layer 107, a free layer 108, and a cap layer 109, respectively. After that, heat treatment was performed in a magnetic field at 270° C. for three hours. Herein, as shown in FIG. 10, the oxide film of CoFe is separated to a metallic part (106A) and an oxide part (106B) by the heart-treatment, so that the effect of the confined current path was exhibited, and a high magnetoresistance ratio was obtained.

The screen type CPP-GMR head utilizing the tilted growth crystalline structured antiferromagnetic film of embodiments of the present invention was prepared by replacing the tunneling magnetoresistive film 92 with the screen type CPP-GMR shown in FIG. 10 in the same producing process as the tunneling magnetoresistive head of the embodiment 5 shown in FIG. 10. Even in this screen type CPP-GMR head, the yield and reliability were greatly improved by using the multilayered film of embodiments of the present invention compared with a head using a conventional antiferromagnetic film. The yield of the conventional structure was 58% and the yield was improved to 85% by using this embodiment of the present invention.

In this embodiment, a screen type CPP-GMR utilizing a confined current path layer was used for the CPP-GMR. Similar effects can be obtained even if a CPP-GMR film configuration is utilized which does not have a confined current path layer and is which formed only of a metal.

Figure 12:
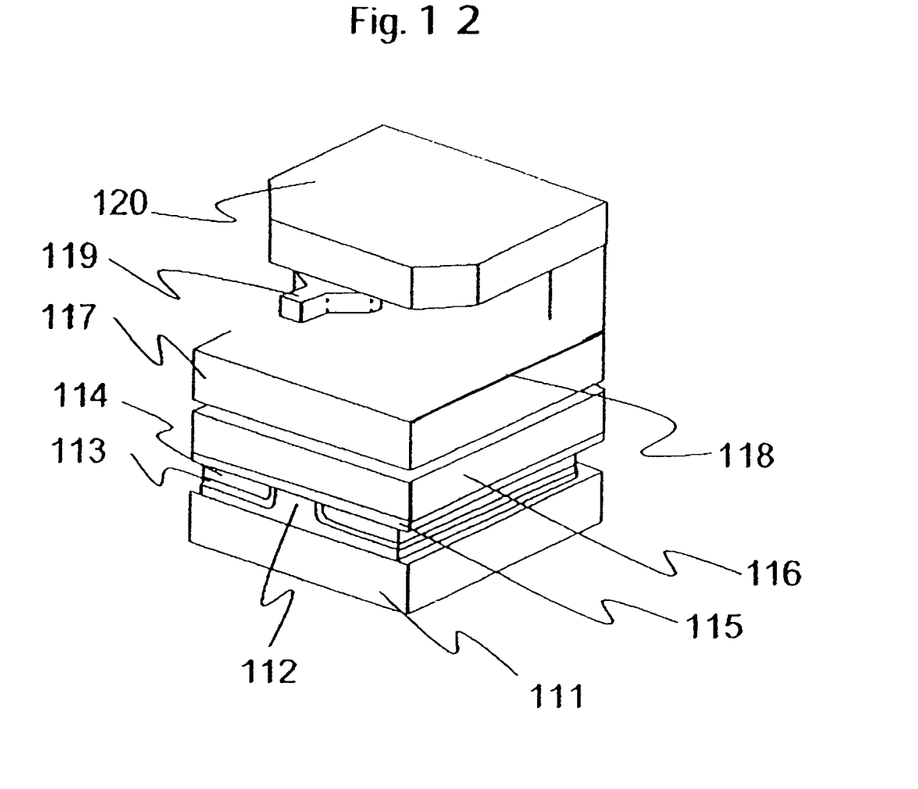
FIG. 12 is a schematic view of a write/read composite magnetoresistive head for perpendicular recording.
Figure 13A:
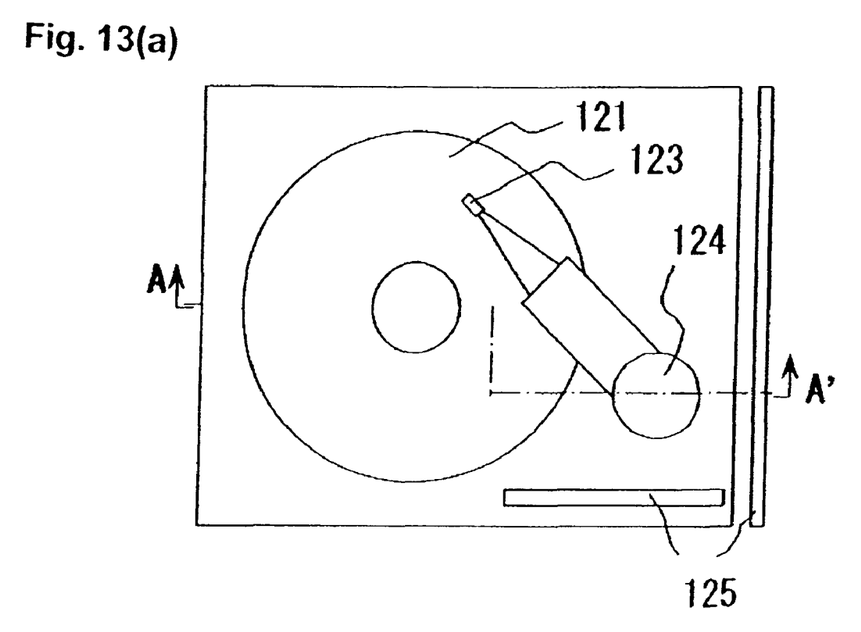
FIGS. 13(a)-13(b) are schematic views of a magnetic storage apparatus.
Figure 13B:
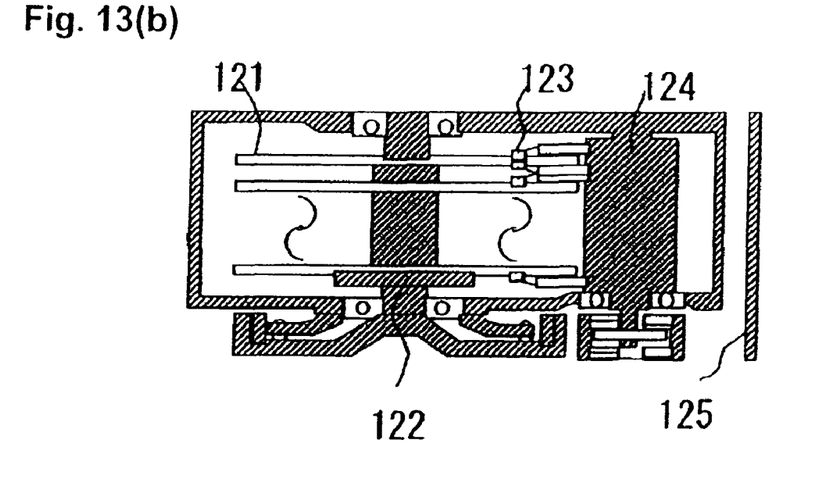

FIG. 12 is a schematic drawing illustrating a write/read composite perpendicular head housing a magnetoresistive head of the present invention formed in the embodiment 5. A read head consists of a lower shield 111, a CPP-GMR 112, a gap film 113, a domain control film 114, a conductive gap film 115, and an upper shield 116 on a substrate which also works as a slider. At the upper side of the read head, a perpendicular recording head consisted of a return pole 117, a coil 118, a main pole 119, and a yoke part 120 is constituted. A magnetic head having a high yield and high reliability is obtained by using a magnetic head according to embodiments of the present invention.

In accordance with an embodiment of the present invention, a CPP-GMR head shown in the embodiment 5 was used and similar effects can be obtained even if a TMR head or a CIP-GMR head is used.

Moreover, a magnetoresistive head according to embodiments of the present invention can be similarly assembled whether the recording head side is a perpendicular recording head or a inductive recording head. However, a higher recording density can be achieved by an assembly with the perpendicular recording head.

A magnetic disk system was manufactured using the above mentioned perpendicular recording write/read magnetoresistive head. FIG. 12 is a schematic drawing illustrating a magnetic disk system. A granular media for perpendicular recording consisting of CoCrPt and $SiO_2$ was used for the magnetic recording medium. The head used in the embodiment 6 was used for the magnetic head 123. The magnetic recording medium 121 where information is magnetically recorded is rotated by using a spindle motor 122 and the head 123 is introduced over the track of the recording medium 121 by using an actuator 124. In the magnetic disk system, the read head and the recording head formed on the head 123 approaches a predetermined recording position on the recording medium 121 and performs a relative motion according to this mechanism, writes signals in order, and reads them. The recording signal is written in the medium by the recording head through a read/write signal processing system 125 and the output of the read head is received as signals through the signal processing system 125.

Using the configuration mentioned above, a magnetic head according to embodiments of the present invention and a magnetic storage apparatus equipped with one were tested. As a result, sufficient output and excellent bias characteristics were obtained; there were a lot of magnetic heads with excellent operational reliability, and a magnetic disk system having a high yield and excellent reliability could be obtained.

What is claimed is:

1. A multilayered film comprising:
   an antiferromagnetic film and a ferromagnetic film,
   said antiferromagnetic film having substantially all of its crystal grains grown at a first inclination relative to a plane of a substrate film wherein a first direction of crystal grain boundaries align in almost a same second inclination in said antiferromagnetic film.

2. A multilayered film according to claim 1,
   wherein said ferromagnetic layer is formed over said antiferromagnetic layer.

3. A multilayered film according to claim 1,
   wherein said crystal grains grow with an inclination angle of 10° or more against a direction of a normal to the substrate.

4. A multilayered film body according to claim 1,
   wherein said antiferromagnetic film is a Mn–X (X=Ir, Rh, Ru, Pt, Pd, Cr) alloy or an alloy composed mainly thereof.

5. A multilayered film comprising:
   an antiferromagnetic film and a ferromagnetic film formed over said antiferromagnetic film, said antiferromagnetic film being formed over a lower film wherein the lower film having substantially all of its crystal grains grown at a first inclination relative to a plane of a substrate film wherein a first direction of crystal grain boundaries align in almost a same second inclination in said lower film.

6. A multilayered film according to claim 5, wherein said crystal grains grow with an inclination angle of 10° or more against a direction of a normal to the substrate.

7. A multilayered film according to claim 5, wherein said antiferromagnetic film is a Mn–X (X=Ir, Rh, Ru, Pt, Pd, Cr) alloy or an alloy composed mainly thereof.

8. A multilayered film comprising:
an antiferromagnetic film and a ferromagnetic film, wherein lattice distortion occurs in the antiferromagnetic film which causes the crystal lattice thickness direction to be in compression and the crystal lattice in-plane direction to be in tension.

9. A magnetoresistive head comprising:
an antiferromagnetic film, a first ferromagnetic film formed over said antiferromagnetic film, a second ferromagnetic film, and an intermediate film formed between said first ferromagnetic film and said second ferromagnetic film,
said antiferromagnetic film having substantially all of its crystal grains grown at a first inclination relative to a plane of a substrate film wherein a first direction of crystal grain boundaries align in almost a same second inclination in said antiferromagnetic film.

10. A magnetoresistive head according to claim 9, wherein said crystal grains grow with an inclination angle of 10° or more against a direction of a normal to the substrate.

11. A magnetoresistive head according to claim 9, wherein said antiferromagnetic film is a Mn–X (X=Ir, Rh, Ru, Pt, Pd, Cr) alloy or an alloy composed mainly thereof.

12. A magnetoresistive head comprising:
an antiferromagnetic film, a first ferromagnetic film formed over said antiferromagnetic film, a second ferromagnetic film, and an intermediate film formed between said first ferromagnetic film and said second ferromagnetic film,
said antiferromagnetic film being formed over a lower film wherein the lower film having substantially all of its crystal grains grown at a first inclination relative to a plane of a substrate film wherein a first direction of crystal grain boundaries align in almost a same second inclination in said lower film.

13. A magnetoresistive head according to claim 12, wherein said crystal grains grow with an inclination angle of 10° or more against a direction of a normal to the substrate.

14. A magnetoresistive head according to claim 12, wherein said antiferromagnetic film is a Mn–X (X=Ir, Rh, Ru, Pt, Pd, Cr) alloy or an alloy composed mainly thereof.

* * * * *